US005496527A

United States Patent [19]
Yokogawa et al.

[11] Patent Number: 5,496,527
[45] Date of Patent: Mar. 5, 1996

[54] PROCESS OF FORMING A HYDROPHOBIC AEROGEL

[75] Inventors: Hiroshi Yokogawa, Hirakata; Masaru Yokoyama, Yao; Koichi Takahama, Amagasaki; Yuriko Uegaki, Hirakata, all of Japan

[73] Assignee: Matsushita Electric Works. Ltd., Kadoma, Japan

[21] Appl. No.: 234,965

[22] Filed: Apr. 28, 1994

[30] Foreign Application Priority Data

Nov. 12, 1993 [JP] Japan .................... 5-283726

[51] Int. Cl.$^6$ .................................. C01B 33/12
[52] U.S. Cl. ................................... 423/338
[58] Field of Search ............................... 423/338

[56] References Cited

U.S. PATENT DOCUMENTS

| | | | |
|---|---|---|---|
| 4,402,927 | 7/1983 | von Dardel et al. | 423/335 |
| 4,432,956 | 2/1984 | Zarzycki et al. | 423/338 |
| 4,610,863 | 7/1986 | Tewari et al. | 423/338 |
| 4,619,908 | 10/1986 | Cheng et al. | 423/338 |
| 4,911,903 | 3/1990 | Unger et al. | 423/335 |
| 4,954,327 | 9/1990 | Blount | 423/338 |
| 5,122,291 | 6/1992 | Wolff et al. | 423/338 |
| 5,275,796 | 1/1994 | Tillotson et al. | 423/338 |

FOREIGN PATENT DOCUMENTS

| | | |
|---|---|---|
| 382310 | 8/1990 | European Pat. Off. . |
| 585456 | 3/1994 | European Pat. Off. . |
| 93/16125 | 8/1993 | WIPO . |

OTHER PUBLICATIONS

Tillotson et al., "Partially Hydrolyzed Alkoxysilanes As Precursors For Silica Aerogels," 121 *Mat. Res. Symp. Proc.* 685 (1988), no month.
Derwent Abstract of JP 4–198238 (Jul. 17, 1992).
Derwent Abstract of JP 5–279011 (Oct. 26, 1993).

*Primary Examiner*—Steven Bos
*Attorney, Agent, or Firm*—Armstrong, Westerman, Hattori, McLeland & Naughton

[57] ABSTRACT

A hydrophobic aerogel having excellent transparency is formed by the following process of the present invention. That is, a first gel having a $SiO_2$ skeleton structure is prepared by hydrolysis and condensation of an alkoxysilane compound in the presence of a solvent. The solvent contained in the first gel is replaced at least partially with a medium to form a second gel. The second gel is reacted with a hydrophobic agent having hydrophobic groups as well as functional groups reactive with silanol groups under a supercritical condition of the medium to form a hydrophobic gel. The medium contained in the hydrophobic aerogel is removed by a supercritical drying method, so that the hydrophobic aerogel having improved transparency and an extremely fine porous structure is obtained.

9 Claims, No Drawings

PROCESS OF FORMING A HYDROPHOBIC AEROGEL

BACKGROUND OF THE INVENTION

1. Field of the Invention

The present invention is related to a process of forming a hydrophobic aerogel having excellent transparency, which is characterized by reacting a gel having a $SiO_2$ skeleton structure with a hydrophobic agent under a supercritical condition of a medium contained in the gel.

2. Disclosure of the Prior Art

An aerogel is useful as a heat insulator having excellent transparency. As disclosed in U.S. Pat. Nos. 4,402,927, No.4,432,956 and No. 4,610,863, an aerogel is formed by the following process. That is, hydrolysis and condensation of an alkoxysilane are performed in the presence of a solvent to prepare a gel having a $SiO_2$ skeleton structure. The alkoxysilane is also named as a silicon alkoxide or alkyl-silicate. After the solvent contained in the gel is replaced with a medium, the medium is removed from the gel by a supercritical drying method to obtain the aerogel.

However, since the $SiO_2$ skeleton structure of the aerogel includes silanol groups having hydrophilicity at a surface thereof, there is a problem that the silanol groups adsorb moisture in the atmosphere as the aerogel is used for many hours, so that optical and thermal properties of the aerogel are lowered, and also a distortion or shrinkage crack of the aerogel appears.

For improving the problem, International Application No. PCT/JP92/00156 discloses a process of forming a hydrophobic aerogel. In the process, after hydrolysis and condensation of an alkoxysilane are performed in the presence of a solvent to prepare a gel having a $SiO_2$ skeleton structure, the gel is reacted with a hydrophobic agent to form a hydrophobic gel. The solvent contained in the hydrophobic gel is replaced with a medium, and then the medium is removed from the hydrophobic gel by a supercritical drying method to obtain the hydrophobic aerogel. However, since a penetration rate of hydrophobic agent into the gel is slow, there is a problem that it takes many hours for penetrating the hydrophobic agent throughout the $SiO_2$ skeleton structure of the gel. In addition, there is another problem that transparency of the hydrophobic aerogel is sightly lowered as compared with transparency of the unreacted aerogel with the hydrophobic agent. It is believed that such a decrease of transparency of the hydrophobic aerogel is caused by insufficient penetration of the hydrophobic agent into the $SiO_2$ skeleton structure of the gel.

SUMMARY OF THE INVENTION

For improving the above problems, the present invention is directed to a process of forming a hydrophobic aerogel having an improved transparency. That is, a gel having a $SiO_2$ skeleton structure is formed by hydrolysis and condensation of an alkoxysilane compound, and contains a medium. The gel is reacted with a hydrophobic agent having hydrophobic groups as well as functional groups reactive to silanol groups under a supercritical condition of the medium to form a hydrophobic gel. Then, the medium is removed from the hydrophobic gel by a supercritical drying method in order to obtain the hydrophobic aerogel of the present invention which has excellent transparency and a extremely fine porous structure. In the present process, since a penetration rate of the hydrophobic agent into the gel is increased under the supercritical condition of the medium, it is possible to efficiently form the hydrophobic aerogel. In addition, there is an advantage that the hydrophobic reaction can be uniformly performed throughout the $SiO_2$ skeleton structure of the gel under the supercritical condition of the medium to prevent a decrease of transparency of the hydrophobic aerogel.

Therefore, it is a primary object of the present invention to provide a process of forming a hydrophobic aerogel having an improved transparency, in which a gel having a $SiO_2$ skeleton structure is reacted with a hydrophobic agent under a supercritical condition of a medium contained in the gel.

It is preferred that the functional group is at least one selected from the group consisting of a halogen, amino group, imino group, carboxyl group, alkoxyl group and hydroxyl group, and the hydrophobic group is at least one selected from the group consisting of alkyl group, phenyl group, and a fluoride thereof.

It is further preferred that the gel is formed by the hydrolysis and condensation of the alkoxysilane compound in the presence of a solvent, and then replacing the solvent at least partially with the medium. In particular, it is preferred that the gel is washed with water after the hydrolysis and condensation and before the replacing step.

It is still further preferred that the hydrophobic agent is an organosilane compound, the solvent is selected form the group consisting of $C_1$-$C_4$ alcohols, acetone and acetonitrile, and the medium is selected from the group consisting of carbon dioxide, $C_1$-$C_4$ alcohols, and a mixture of carbon dioxide and at least one of $C_1$-$C_4$ alcohols. In particular, since carbon dioxide is relatively low critical temperature and pressure, it or its mixture is more preferably used as the medium.

These and further objects, purposes, features, and advantages of the present invention will become apparent to those skilled in the art upon further study of the specification and appended claims.

DETAIL DESCRIPTION OF THE INVENTION

In a process of forming a hydrophobic aerogel of the present invention, a first gel having a $SiO_2$ skeleton structure is prepared by hydrolysis and condensation of an alkoxysilane compound in the presence of a solvent. The alkoxysilane compound is selected from the following groups (1) to (4):

(1) an alkoxysilane having two functional groups expressed by the following formula (I),

wherein each of $R^1$, $R^2$ and $R^3$ stands for a $C_1$-$C_5$ alkyl group or phenyl group. Concretely, the following alkoxysilanes such as dimethyldimethoxysilane, dimethyldiethoxysilane, diphenyldiethoxysilane, diphenyldimethoxysilane, methylphenyldiethoxysilane, methylphenyldimethoxysilane, diethyldiethoxysilane, and diethyldimethoxysilane, etc., are acceptable for the present invention;

(2) an alkoxysilane having three functional groups expressed by the following formula (II),

wherein each of $R^4$ and $R^5$ stands for a $C_1$-$C_5$ alkyl group or phenyl group. Concretely, the following alkoxysilanes such as methyltrimethoxysilane, methyltriethoxysilane, ethyltrimethoxysilane, ethyltriethoxysilane, phenyltrimethoxysilane, and phenyltriethoxysilane, etc., are acceptable for the present invention;

(3) an alkoxysilane having four functional groups expressed by the following formula (III),

$$Si(OR_6)_4 \quad (III)$$

wherein each of $R^6$ stands for a $C_1$-$C_5$ alkyl group or phenyl group. For example, the following alkoxysilanes such as tetramethoxysilane and tetraethoxysilane are acceptable for the present invention; and (4) an oligomer of an alkoxysilane expressed by the following formula (IV),

wherein R stands for an alkyl group or phenyl group, and preferably methyl group (—CH3) or ethyl group (—$C_2H_5$), and n is an integral number which designates a degree of polymerization. It is possible to replace at least one of OR— with OH— when the oligomer can maintain a stable structure thereof prior to the hydrolysis and condensation. It is preferred that n is less than 10, and preferably 2 to 6 for efficiently preparing the first gel. In addition, it is possible to use an oligomer having a distribution of the degree of polymerization, or oligomer having a chain molecular structure, branching molecular structure, cyclic molecular structure, or a mixed structure of these molecular structures. Concretely, in case of using an oligomer of methoxysilane, it is preferred that the average molecular weight of the oligomer is in the range of 250 to 700, and in case of using an oligomer of ethoxysilane, it is preferred that the average molecular weight of the oligomer is in the range of 300 to 900.

The solvent is capable of dissolving the alkoxysilane compound therein, and selected from the group consisting of acetone, acetonitrile, and $C_1$-$C_4$ alcohols of methanol, ethanol, isopropyl alcohol and butanol. In particular, at least one of $C_1$-$C_4$ alcohols is preferably used as the solvent from the viewpoint of the generation of an alcohol during the hydrolysis and condensation. When using a mixture solution of the solvent and water, the hydrolysis and condensation of the alkoxysilane can be continuously preformed. For more efficiently performing the hydrolysis and condensation of the alkoxysilane compound, it is further preferred to use an catalyst which is selected from the group consisting of an acid catalyst such as hydrochloric acid, citric acid, nitric acid, sulfuric acid, and ammonium fluoride, etc., and a base catalyst such as ammonia and piperidine, etc. A mixture ratio of the alkoxysilane, the solvent, water and the catalyst which is used if necessary, is varied case by case in order to obtain a hydrophobic aerogel having required transparency, bulk density, and reflective index thereof.

It is preferred that the first gel is washed with the fresh solvent or water after gelation. For example, when the solvent contained in the first gel is replaced with water for cleaning the first gel, functional groups in a surface of the $SiO_2$ skeleton structure of the first gel are changed with silanol groups. The change facilitates a hydrophobic reaction described later. In particular, it is preferred that the first gel is washed with water when at least one of $C_1$-$C_4$ alcohols is used as the solvent, or when there is a small ratio of water in a mixture of the alkoxysilane compound, the solvent, water and the catalyst. Of course, it is possible to replace the alcohol contained in the first gel with the fresh alcohol for cleaning the first gel.

Subsequently, the solvent and/or water contained in the first gel is replaced at least partially with a medium to form a second gel. The medium is selected from the group consisting of $C_1$-$C_4$ alcohols, carbon dioxide, dichlorodifluoromethane, water and a mixture thereof. In particular, carbon dioxide, at least one of $C_1$-$C_4$ alcohols or a mixture of carbon dioxide and at least one of $C_1$-$C_4$ alcohols is preferably used as the medium. Of course, when at least one of $C_1$-$C_4$ alcohols is used as the solvent, it is possible to use the alcohol as the medium. However, in this case, it is preferred that the first gel is washed with the fresh alcohol. In addition, it is possible to replace the alcohol contained in the first gel with carbon dioxide. Since carbon dioxide has relatively low critical temperature and pressure, carbon dioxide is useful for easy reproduction of supercritical condition thereof. Concretely, in case of using carbon dioxide as the medium, the first gel is dipped in carbon dioxide at a temperature of 20° to 25° C. under a pressure of 50 to 100 atm to replace the solvent contained in the first gel with carbon dioxide. Additionally, when one of $C_1$-$C_4$ alcohols contained in the first gel as the solvent is diluted to a mixture of carbon dioxide and another one of $C_1$-$C_4$ alcohols, it is possible to use a mixture of the alcohols and carbon dioxide as the medium.

Subsequently, the second gel is reacted with a hydrophobic agent having hydrophobic groups as well as functional groups reactive with silanol groups under a supercritical condition of the medium to form a hydrophobic gel. In this time, it is necessary that the hydrophobic agent is dissolved in the medium, and is not decomposed under the supercritical condition. The functional group of the hydrophobic agent is selected from the group consisting of a halogen, amino group, imino group, carboxyl group, alkoxyl group and hydroxyl group. On the other hand, the hydrophobic group is selected from the group consisting of alkyl group, phenyl group, and a fluoride thereof. Concretely, the hydrophobic agent is at least one selected from the group consisting of organosilane compounds of hexamethyldisilazane, hexamethyldisiloxane, trimethylchlorosilane, trimethylmethoxysilane, trimethylethoxysilane, triethylethoxysilane, triethylmethoxysilane, dimethyldichlorosilane, dimethyldiethoxysilane, methyltrichlorosilane, and ethyltrichlorosilane, etc., and carboxylic acids of acetic acid, formic acid and succinic acid, etc., and a halogenated alkyl such as methylchloride, etc.

For example, the supercritical condition is reached by heating the medium at a critical temperature or more thereof under a critical pressure or more thereof. When using a mixture of at least one of $C_1$-$C_4$ alcohols and carbon dioxide as the medium, the hydrophobic reaction is performed under a supercritical condition of the mixture. Of course, when the solvent contained in the first gel is completely replaced with carbon dioxide, the hydrophobic reaction is performed under a supercritical condition of carbon dioxide.

After the hydrophobic reaction, the medium contained in the hydrophobic gel is removed by a supercritical drying method to obtain the hydrophobic aerogel of the present invention. For example, after the second gel is reacted with the hydrophobic agent under a supercritical condition which is reached by heating the medium at a temperature more than the critical temperature under a pressure more than the critical pressure thereof, the supercritical drying method is performed by decreasing the pressure of the medium while keeping the temperature thereof. If the medium is removed from the hydrophobic gel by a conventional heat-drying method, that is, by applying a phase transition from liquid phase to vapor phase thereof, the extremely fine $SiO_2$ skeleton structure of the hydrophobic gel would be broken due to a surface tension of the medium during the phase transition. However, when the medium is removed from the hydrophobic gel by the supercritical drying method, that is, by applying a phase transition from the supercritical condition to the vapor phase of the medium, it is possible to obtain the hydrophobic aerogel of the present invention without breaking the $SiO_2$ skeleton structure thereof.

Therefore, the hydrophobic aerogel of the present invention is a porous structure which is composed of extremely fine $SiO_2$ particles linked each other to form the $SiO_2$ skeleton structure. As the average particle size of the $SiO_2$ particles and a distance between the adjacent $SiO_2$ particles are much shorter than the wave length of a visible ray and a mean free pass of the air, the hydrophobic aerogel can demonstrates excellent transparency and low thermal conductivity irrespective of the porous structure thereof. In addition, since hydroxyl groups of silanol groups in a surface of the $SiO_2$ skeleton of the second gel are replaced with the hydrophobic groups of the hydrophobic agent during the hydrophobic reaction, the hydrophobic aerogel can stably maintain the transparency and low thermal conductivity without causing a distortion or shrinkage crack thereof even after using it for many hours in the atmosphere. In particular, in the present invention, since a penetration rate of the hydrophobic agent into the $SiO_2$ skeleton structure of the second gel is increased under the supercritical condition, the hydrophobic reaction is uniformly performed throughout the $SiO_2$ skeleton structure for a relatively short time period, so that a decrease of transparency of the hydrophobic aerogel caused by insufficient penetration of the hydrophobic agent into the $SiO_2$ skeleton structure can be prevented.

EXAMPLE 1

A mixture solution consisting essentially of 30 parts by weight of tetramethoxysilane (manufactured by TORAY DOW CORNING SILICONE LTD.) as an alkoxysilane, 828 parts by weight of ethanol as a solvent, 4 parts by weight of water, and 14 parts by weight of 15N aqueous ammonia as a catalyst, was prepared. After the mixture solution hydrolyzed at a room temperature while agitating it for 1 minute, it was casted into a beaker having the diameter of 50 mm and kept in the beaker for a whole day for gelation of the mixture solution. In addition, condensation of the resultant was facilitated by heating the beaker at 50° C. while repeating a further addition of ethanol so as not to dry the gel, so that a gel having a $SiO_2$ skeleton structure was formed. The gel is a disc shape having the diameter of 50 mm and the thickness of 5 mm.

The gel was dipped into liquefied carbon dioxide which was maintained at the temperature of 18 ° C. under the pressure of 55 atm in an autoclave of a supercritical gas extracting device(Type "S-2-2" manufactured by AKICO LTD.). A volume of the autoclave is 2 liters. After the autoclave was filled with a mixture of ethanol and carbon dioxide as a medium, 0.6 mol % of hexamethyldisilazane was added as a hydrophobic agent in the autoclave under a supercritical condition (80° C. and 160 atm) of the medium and reacted with the gel for 2 hours such that a hydrophobic reaction is uniformly performed throughout the $SiO_2$ skeleton structure of the gel to form a hydrophobic gel. Subsequently, carbon dioxide in the same supercritical condition was flowed into the autoclave to replace the mixture with carbon dioxide. Carbon dioxide contained in the hydrophobic gel was removed by decreasing the pressure of carbon dioxide while keeping the temperature of carbon dioxide, that is, in accordance with a supercritical drying method. It took about 15 hours from the addition of the hydrophobic agent to the end of the supercritical drying method. As the result, a hydrophobic aerogel having the thickness of 5 mm was obtained.

EXAMPLE 2

A hydrophobic aerogel of EXAMPLE 2 was formed by the substantially same method as EXAMPLE 1 except for using trimethylchlorosilane in place of hexamethyldisilazane.

EXAMPLE 3

A hydrophobic aerogel of EXAMPLE 3 was formed by the substantially same method as EXAMPLE 1 except that ethanol contained in a gel formed by the same process as EXAMPLE 1 was replaced with carbon dioxide in the autoclave, and the same hydrophobic agent as EXAMPLE 1 was added in the autoclave under a supercritical condition (40° C. and 80 arm) of carbon dioxide and reacted with the gel for 2 hours.

EXAMPLE 4

A hydrophobic aerogel of EXAMPLE 4 was formed by the substantially same method as EXAMPLE 1 except that ethanol was used as the medium in place of the mixture of ethanol and carbon dioxide, and the same hydrophobic agent as EXAMPLE 1 was added in the autoclave under a supercritical condition (250° C. and 80 atm) of ethanol and reacted with the gel for 2 hours.

EXAMPLE 5

A hydrophobic aerogel of EXAMPLE 5 was formed by the substantially same method as EXAMPLE 1 except that a mixture solution consisting essentially of 21 parts by weight of tetraethoxysilane as an alkoxysilane, 25 parts of weight of ethanol as a solvent, and 9 parts by weight of an aqueous solution of 0.04N ammonium fluoride as a catalyst, was used in place of the mixture solution of Example 1.

EXAMPLE 6

A hydrophobic aerogel of EXAMPLE 6 was formed by the substantially same method as EXAMPLE 1 except that a mixture solution consisting essentially of 47 parts by weight of an oligomer of tetramethoxysilane ("METHYL-SILICATE 51" manufactured by COLCOAT LTD., the average molecular weight: 470) as an alkoxysilane, 552 parts by weight of ethanol and 27 parts by weight of water as a solvent, and 13 parts by weight of 15N aqueous ammonia as a catalyst, was used in place of the mixture solution of Example 1.

EXAMPLE 7

A hydrophobic aerogel of EXAMPLE 7 was formed by the substantially same method as EXAMPLE 3 except for using a gel formed by the same process as EXAMPLE 6 in place of the gel used in EXAMPLE 3.

EXAMPLE 8

A hydrophobic aerogel of EXAMPLE 8 was formed by the substantially same method as EXAMPLE 3 except that a gel formed by the same process as EXAMPLE 6 was used in place of the gel of EXAMPLE 3, the gel was dipped in water for a cleaning thereof, and then a mixture of ethanol and water contained in the gel was replaced with carbon dioxide.

COMPARATIVE EXAMPLE 1

An aerogel of COMPARATIVE EXAMPLE 1 was formed by the substantially same method as EXAMPLE 1 except that the hydrophobic agent was not added.

COMPARATIVE EXAMPLE 2

An aerogel of COMPARATIVE EXAMPLE 2 was formed by the substantially same method as EXAMPLE 4 except that the hydrophobic agent was not added.

COMPARATIVE EXAMPLE 3

A hydrophobic aerogel of COMPARATIVE EXAMPLE 3 was formed by the following method. The gel of EXAMPLE 1 was used in COMPARATIVE EXAMPLE 3. Hexamethyldisilazane as a hydrophobic agent was dissolved in toluene at a ratio of 1.2 mol/l thereof to form a toluene solution. The gel was dipped for a whole day in the toluene solution. A volume of the toluene solution is five times as much as the volume of the gel to sufficiently penetrate the hydrophobic agent into the gel. Subsequently, the toluene solution was refluxed while heating it at 110° C. for 4 hours to perform a hydrophobic reaction of the gel, so that a hydrophobic gel of COMPARATIVE EXAMPLE 3 was obtained. In addition, an ethanol cleaning of the hydrophobic gel was repeated to remove unreacted hexamethyldisilazane, a subproduct of hexamethyldisilazane and toluene from the hydrophobic gel. It took 5 days from the dipping of the gel in the toluene solution to finishing the ethanol cleaning.

The hydrophobic gel was dipped in liquefied carbon dioxide which was maintained at the temperature of 18° C. under the pressure of 55 atm in the autoclave used in EXAMPLE 1. After the autoclave was filled with a mixture of ethanol and carbon dioxide as a medium, the medium was kept under a supercritical condition (80° C. and 160 atm) thereof. In addition, carbon dioxide in the same supercritical condition was flowed into the autoclave to replace the mixture with carbon dioxide. Carbon dioxide contained in the hydrophobic gel was removed therefrom by decreasing the pressure of carbon dioxide while keeping the temperature of carbon dioxide, that is, in accordance with a supercritical drying method. As the result, the hydrophobic aerogel having the thickness of 5 mm was obtained.

COMPARATIVE EXAMPLE 4

A gel formed by the same process of EXAMPLE 1 was used in COMPARATIVE EXAMPLE 4. Trimethylchlorosilane as a hydrophobic agent was dissolved in ethanol at a ratio of 1.2 mol/l thereof to form an ethanol solution. The gel was dipped for a whole day in the ethanol solution. A volume of the ethanol solution is five times as much as the volume of the gel to sufficiently penetrate the hydrophobic agent into the gel. Subsequently, the ethanol solution was refluxed while heating it at 75° C. for 4 hours to perform a hydrophobic reaction of the gel, so that a hydrophobic gel of COMPARATIVE EXAMPLE 4 was obtained. The transition from the hydrophobic gel to a hydrophobic aerogel of COMPARATIVE EXAMPLE 4 was performed by the same method as COMPARATIVE EXAMPLE 3.

TABLE 1 shows hydrophobic agents, alkoxysilane compounds, solvents, mediums, and supercritical conditions of EXAMPLES 1–8 and COMPARATIVE EXAMPLES 1–4.

TABLE 2 shows bulk density, thermal conductivity, and light transmissivity of each of aerogels formed in EXAMPLES 1–8 and COMPARATIVE EXAMPLES 1–4, which were measured before and after a humidity test. TABLE 2 also shows specific surface of each of the aerogels which was measured by a nitrogenabsorption BET method immediately after the supercritical drying. The thermal conductivity was measured at temperatures of 20° C. and 40° C. in accordance with ASTM C-518 by the use of a thermal conductivity measuring device. The light transmissivity was determined by measuring a spectrum distribution of visible radiation passing through the aerogel in accordance with the method of JIS-R3106 by the use of a spectrophotometer. The humidity test was performed by keeping the aerogel at the temperature of 60° C. and the relative humidity of 90% for 48 hours.

As shown in TABLE 2, thermal conductivity and bulk density of each of the hydrophobic aerogels of EXAMPLES 1–8 are almost equal to those of each of COMPARATIVE EXAMPLES 3 and 4. In addition, it is confirmed that each of the hydrophobic aerogels of EXAMPLES 1–8 and COMPARATIVE EXAMPLES 3 and 4 stably maintains excellent light transmissivity, high thermal conductivity, and bulk density even after the humidity test. However, in more detail analysis of the results, all of the hydrophobic aerogels of EXAMPLES 1–8 show higher light transmissivity than the hydrophobic aerogels of COMPARATIVE EXAMPLES 3 and 4. As the reason, it is believed that a hydrophobic reaction was uniformly performed throughout an extremely fine $SiO_2$ skeleton structure of the gel formed in each of EXAMPLES 1–8 under a supercritical condition of a medium. On the other hand, though each of the aerogels of COMPARATIVE EXAMPLES 1 and 2 shows a high light transmissivity, it was considerably deteriorated after the humidity test because a hydrophobic reaction was not performed.

From these results, it is concluded that performing a hydrophobic reaction under a supercritical condition of a medium contained in a gel is effective for improving transparency of the hydrophobic aerogel.

TABLE 1

|  | Alkoxysilane | Catalyst | Solvent for Cleaning | Hydrophobic Agent | Dispersion Medium | Supercritical condition |
| --- | --- | --- | --- | --- | --- | --- |
| EXAMPLE 1 | Tetramethoxysilane | Aqueous ammonia | Ethanol | Hexamethyldisilazane | Ethanol/$CO_2$ | 80° C., 160 atm |
| EXAMPLE 2 | Tetramethoxysilane | Aqueous ammonia | Ethanol | Trimethylchlorosilane | Ethanol/$CO_2$ | 80° C., 160 atm |

TABLE 1-continued

| | Alkoxysilane | Catalyst | Solvent for Cleaning | Hydrophobic Agent | Dispersion Medium | Supercritical condition |
|---|---|---|---|---|---|---|
| EXAMPLE 3 | Tetramethoxysilane | Aqueous ammonia | Ethanol | Hexamethyldisilazane | $CO_2$ | 40° C., 80 atm |
| EXAMPLE 4 | Tetramethoxysilane | Aqueous ammonia | Ethanol | Hexamethyldisilazane | Ethanol | 250° C., 80 atm |
| EXAMPLE 5 | Tetramethoxysilane | Ammonia fluoride | Ethanol | Hexamethyldisilazane | Ethanol/$CO_2$ | 80° C., 160 atm |
| EXAMPLE 6 | Oligomer of Tetramethoxysilane | Aqueous ammonia | Ethanol | Hexamethyldisilazane | Ethanol/$CO_2$ | 80° C., 160 atm |
| EXAMPLE 7 | Oligomer of Tetramethoxysilane | Aqueous ammonia | Not used | Hexamethyldisilazane | $CO_2$ | 40° C., 80 atm |
| EXAMPLE 8 | Oligomer of Tetramethoxysilane | Aqueous ammonia | Water | Hexamethyldisilazane | $CO_2$ | 40° C., 80 atm |
| COMPARATIVE EXAMPLE 1 | Tetramethoxysilane | Aqueous ammonia | Ethanol | — | Ethanol/$CO_2$ | 80° C., 160 atm |
| COMPARATIVE EXAMPLE 2 | Tetramethoxysilane | Aqueous ammonia | Ethanol | — | Ethanol | 250° C., 80 atm |
| COMPARATIVE EXAMPLE 3 | Tetramethoxysilane | Aqueous ammonia | Ethanol | Hexamethyldisilazane in toluene | — | 80° C., 160 atm |
| COMPARATIVE EXAMPLE 4 | Tetramethoxysilane | Aqueous ammonia | Ethanol | Hexamethyldisilazane in ethanol | — | 80° C., 160 atm |

TABLE 2

| | Specific Surface ($m^2/g$) | Bulk Density (g/$cm^3$) | | Thermal Conductivity (Kcal/mhC) | | Light Transmissivity (%) | |
|---|---|---|---|---|---|---|---|
| | | Before Humidity Test (*1) | After Humidity Test | Before Humidity Test | After Humidity Test | Before Humidity Test | After Humidity Test |
| EXAMPLE 1 | 1108 | 0.04 | 0.04 | 0.010 | 0.011 | 91.8 | 91.2 |
| EXAMPLE 2 | 1116 | 0.05 | 0.05 | 0.011 | 0.011 | 90.5 | 90.4 |
| EXAMPLE 3 | 1201 | 0.04 | 0.04 | 0.011 | 0.011 | 92.4 | 91.9 |
| EXAMPLE 4 | 1088 | 0.05 | 0.05 | 0.011 | 0.012 | 89.8 | 89.0 |
| EXAMPLE 5 | 905 | 0.10 | 0.10 | 0.012 | 0.012 | 85.1 | 84.6 |
| EXAMPLE 6 | 1386 | 0.04 | 0.04 | 0.010 | 0.010 | 95.5 | 95.2 |
| EXAMPLE 7 | 1258 | 0.04 | 0.04 | 0.012 | 0.012 | 92.5 | 92.3 |
| EXAMPLE 8 | 1055 | 0.05 | 0.05 | 0.013 | 0.013 | 92.0 | 92.0 |
| COMPARATIVE EXAMPLE 1 | 1005 | 0.06 | 0.17 | 0.011 | 0.020 | 86.2 | 58.2 |
| COMPARATIVE EXAMPLE 2 | 897 | 0.08 | 0.21 | 0.013 | 0.038 | 85.4 | 59.7 |
| COMPARATIVE EXAMPLE 3 | 886 | 0.04 | 0.04 | 0.011 | 0.011 | 81.9 | 80.8 |
| COMPARATIVE EXAMPLE 4 | 916 | 0.04 | 0.04 | 0.013 | 0.013 | 82.5 | 81.3 |

*1 The humidity test was performed by keeping an aerogel at the temperature of 60° C. and the relative humidity of 90% for 48 hours.

What is claimed is:

1. A process of forming a hydrophobic aerogel comprising:

a gelation step of providing a gel having a $SiO_2$ skeleton structure formed by hydrolysis and condensation of an alkoxysilane compound selected from the group consisting of the following formulae I, II, III and IV:

$$R^2-Si(OR^3)_2 \atop |^{R^1}  \quad (I)$$

wherein each of $R^1$, $R^2$ and $R^3$ is independently a $C_1$-$C_5$ alkyl group;

$$R^4\text{-Si}(OR^5)_3 \quad (II)$$

wherein each of $R^4$ and $R^5$ is independently a $C_1$-$C_5$ alkyl group;

$$Si(OR^6)_4 \quad (III)$$

wherein $R^6$ is a $C_1$-$C_5$ alkyl group; and

wherein R is independently a $C_1$-$C_5$ alkyl group and n is an integral number;

a hydrophobic step of reacting said gel in a reaction chamber with a hydrophobic agent selected from the group consisting of organosilanes, carboxylic acids and halogenated alkyl, wherein said hydrophobic agent comprises hydrophobic groups selected from the group consisting of alkyl group, fluoroalkyl group, phenyl group, and a fluorophenyl group as well as functional groups reactive with silanol groups, said functional groups selected from the group consisting of halogens, amino group, imino group, carboxyl group, alkoxyl group and hydroxyl group, in the presence of a medium selected from the group consisting of $C_1$-$C_4$ alcohols, carbon dioxide, dichlorodifluoromethane, water and mixtures thereof under a supercritical condition based on said medium to form a hydrophobic gel, said hydrophobic agent being introduced into said reaction chamber after said medium reaches supercritical condition; and a dry step of supercritically drying said hydrophobic gel to remove said medium to obtain said hydrophobic aerogel which is transparent and of a porous structure.

2. The process as set forth in claim 1, wherein said gelation step comprises a first sub-step of forming said gel by hydrolyzing and condensing said alkoxysilane compound in the presence of a solvent, and a second sub-step of replacing said solvent contained in said gel at least partially with said medium.

3. The process as set forth in claim 1, wherein said hydrophobic agent is an organosilane compound.

4. The process as set forth in claim 1, wherein said medium is selected from the group consisting of $C_1$-$C_4$ alcohols, carbon dioxide and a mixture of carbon dioxide and at least one of $C_1$-$C_4$ alcohols.

5. The process as set forth in claim 4, wherein said medium is at least one of $C_1$-$C_4$ alcohols.

6. The process as set forth in claim 2, wherein the solvent is selected from the group consisting of $C_1$-$C_4$ alcohols, acetone and acetonitrile.

7. A process as set forth in claim 2, wherein the hydrolysis and condensation of said alkoxysilane compound are performed in the presence of a mixture of said solvent and water.

8. A process as set forth in claim 2, wherein said gel is washed with water after said first sub-step and before said second sub-step.

9. A process of forming a hydrophobic aerogel comprising:

a gelation step of providing a gel having a $SiO_2$ skeleton structure formed by hydrolysis and condensation of an alkoxysilane compound selected from the group consisting of the following formulae I, II, III and IV:

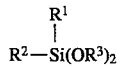
(I)

wherein each of $R^1$, $R^2$ and $R^3$ is independently a $C_1$-$C_5$ alkyl group;

(II)

wherein each of $R^4$ and $R^5$ is independently a $C_1$-$C_5$ alkyl group;

(III)

wherein $R^6$ is a $C_1$-$C_5$ alkyl group; and

(IV)

wherein R is independently a $C_1$-$C_5$ alkyl group and n is an integral number;

a hydrophobic step of reacting said gel in a reaction chamber with a hydrophobic agent selected from the group consisting of organosilanes, carboxylic acids and halogenated alkyl, wherein said hydrophobic agent comprises hydrophobic groups selected from the group consisting of alkyl group, fluoroalkyl group, phenyl group, and a fluorophenyl group as well as functional groups reactive with silanol groups, said functional groups selected from the group consisting of halogens, amino group, imino group, carboxyl group, alkoxyl group and hydroxyl group, in the presence of a medium consisting of carbon dioxide under a supercritical condition based on carbon dioxide to form a hydrophobic gel, said hydrophobic agent being introduced into said reaction chamber after said medium reaches supercritical condition; and a dry step of supercritically drying said hydrophobic gel to remove said medium to obtain said hydrophobic aerogel which is transparent and of a porous structure.

\* \* \* \* \*